United States Patent [19]

Okazaki

[11] Patent Number: 5,343,485

[45] Date of Patent: Aug. 30, 1994

[54] LASER DIODE PUMPED SOLID STATE LASER

[75] Inventor: Yoji Okazaki, Kanagawa, Japan

[73] Assignee: Fuji Photo Film Co., Ltd., Kanagawa, Japan

[21] Appl. No.: 937,970

[22] Filed: Sep. 1, 1992

[30] Foreign Application Priority Data

Sep. 11, 1991 [JP] Japan .................. 3-231739

[51] Int. Cl.⁵ .............................................. H01S 3/10
[52] U.S. Cl. ........................................ 372/22; 372/21; 372/69; 372/18; 372/92
[58] Field of Search ................ 372/18, 22, 69, 92, 372/70, 21; 359/328

[56] References Cited

U.S. PATENT DOCUMENTS

| | | | |
|---|---|---|---|
| 4,933,944 | 6/1990 | McGraw | 372/18 |
| 4,942,582 | 7/1990 | Kintz et al. | 372/18 |
| 5,054,027 | 10/1991 | Goodberlet et al. | 372/18 |
| 5,123,026 | 6/1992 | Fan et al. | 372/22 |
| 5,187,714 | 2/1993 | Okazaki et al. | 372/22 |

Primary Examiner—Leon Scott, Jr.
Attorney, Agent, or Firm—Sughrue, Mion, Zinn, Macpeak & Seas

[57] ABSTRACT

In a laser diode pumped solid state laser, a primary solid state laser medium containing a rare earth metal is pumped by a semiconductor laser, and the wavelength of a laser beam having been obtained from the solid state laser oscillation is converted by a nonlinear optical material into a different wavelength. A solid state laser medium for injection locking is located between the primary solid state laser medium and the semiconductor laser. The solid state laser medium for injection locking is pumped by the semiconductor laser and produces a laser beam for injection locking through solid state laser oscillation in a single longitudinal mode, such that the laser beam for injection locking may impinge upon the primary solid state laser medium.

3 Claims, 1 Drawing Sheet

LASER DIODE PUMPED SOLID STATE LASER

BACKGROUND OF THE INVENTION

1. Field of the Invention

This invention relates to a laser diode pumped solid state laser. This invention particularly relates to a laser diode pumped solid state laser, wherein the wavelength of a laser beam, which has been obtained from solid state laser oscillation, is converted into a different wavelength, e.g., is shortened, by using a nonlinear optical material, and wherein generation of a laser beam in a single longitudinal mode is enabled by injection rocking.

2. Description of the Prior Art

Laser diode pumped solid state lasers have been proposed in, for example, Japanese Unexamined Patent Publication No. 62(1987)-189783. The proposed laser diode pumped solid state lasers comprise a solid state laser medium, which has been containing a rare earth metal, such as neodymium (Nd). The solid state laser medium is pumped by a semiconductor laser (a laser diode). In the laser diode pumped solid state laser of this type, in order for a laser beam having as short a wavelength as possible to be obtained, a bulk single crystal of a nonlinear optical material for converting the wavelength of a laser beam, which has been obtained from solid state laser oscillation, is located in a resonator of the solid state laser. The laser beam, which has been obtained from the solid state laser oscillation, is thereby converted into its second harmonic, or the like.

In cases where such a laser diode pumped solid state laser is used, it is desired that a laser beam, the wavelength of which has been shortened, be obtained with a stable output power. However, with the conventional laser diode pumped solid state lasers, a laser beam having a stable output power cannot always be obtained because of longitudinal mode competition of the laser beam, which has been obtained from the solid state laser oscillation.

Therefore, for the purposes of achieving solid state laser oscillation in a single longitudinal mode, it has heretofore been proposed to provide a semiconductor laser for injection locking independently of a semiconductor laser for producing a pumping laser beam. In such cases, a laser beam, which has been produced by the semiconductor laser for injection locking, is caused to impinge upon a solid state laser medium for injection locking, and the solid state laser medium for injection locking is pumped. A laser beam, which has thus been obtained from the solid state laser medium for injection locking in the single longitudinal mode, is then caused to impinge upon a primary solid state laser medium, which is independent of the solid state laser medium for injection locking. With such a technique, injection locking is effected in the primary solid state laser medium by the laser beam for injection locking, and the solid state laser is caused to oscillate in the single longitudinal mode.

However, with the technique described above, it is necessary to provide the semiconductor laser for injection locking. Also, it is necessary to provide a beam splitter, mirrors, or the like, for combining the laser beam for injection locking and the pumping beam with each other. Therefore, the problems occur in that, because the number of parts required increases, the cost of the solid state laser cannot be kept low, its reliability cannot be kept high, and assembly and adjustment processes become complicated.

SUMMARY OF THE INVENTION

The primary object of the present invention is to provide a laser diode pumped solid state laser, which undergoes stable oscillation in a single longitudinal mode, which yields a wavelength-converted wave having a stable output power, and which has a simple structure.

The present invention provides a laser diode pumped solid state laser, in which a primary solid state laser medium containing a rare earth metal is pumped by a semiconductor laser, and the wavelength of a laser beam having been obtained from the solid state laser oscillation is converted by a nonlinear optical material into a different wavelength, wherein the improvement comprises the provision of a solid state laser medium for injection locking, which is located between said primary solid state laser medium and said semiconductor laser, said solid state laser medium for injection locking being pumped by said semiconductor laser and producing a laser beam for injection locking through solid state laser oscillation in a single longitudinal mode, such that said laser beam for injection locking may impinge upon said primary solid state laser medium.

With the laser diode pumped solid state laser in accordance with the present invention, the laser beam for injection locking, which has been produced in the single longitudinal mode, is caused to impinge upon the primary solid state laser medium. As a result, injection locking is effected, and the solid state laser is caused to oscillate in the single longitudinal mode. When the solid state laser oscillation is thus effected in the single longitudinal mode, no longitudinal mode competition occurs, and a wavelength-converted wave can be obtained, which has a stable output power.

Also, with the laser diode pumped solid state laser in accordance with the present invention, the semiconductor laser for pumping the primary solid state laser medium is utilized also as a semiconductor laser for injection locking. Therefore, the laser beam for injection locking follows the same optical path as the pumping beam and impinges upon the primary solid state laser medium. Accordingly, no particular optical device need be provided in order to combine the laser beam for injection locking and the pumping beam with each other. Because such a particular optical device is unnecessary and only a single semiconductor laser need be provided, the laser diode pumped solid state laser in accordance with the present invention is very simple in structure. For these reasons, with the laser diode pumped solid state laser in accordance with the present invention, the cost can be kept low, the reliability can be kept high, and assembly and adjustment processes can be kept easy.

DESCRIPTION OF THE PREFERRED EMBODIMENTS

The present invention will hereinbelow be described in further detail with reference to the accompanying drawings.

Figure 1:
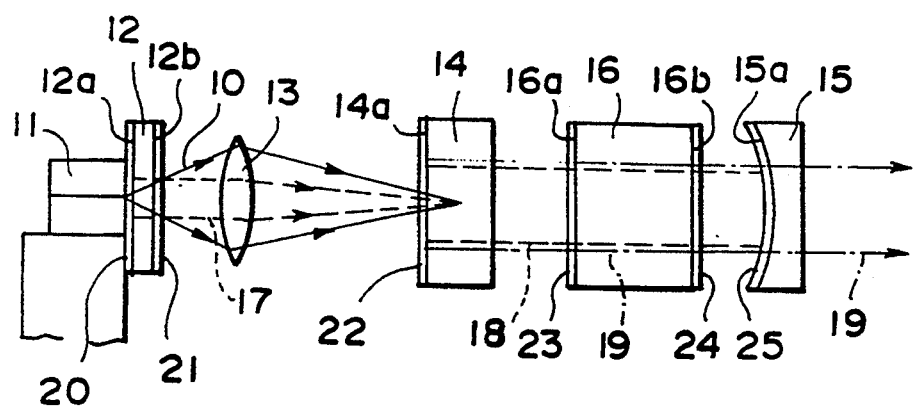
FIG. 1 is a side view showing a first embodiment of the laser diode pumped solid state laser in accordance with the present invention.

FIG. 1 shows a first embodiment of the laser diode pumped solid state laser in accordance with the present invention.

With reference to FIG. 1, the laser diode pumped solid state laser is provided with a laser diode 11, which produces a laser beam 10 serving as a pumping beam, and a YVO$_4$ crystal 12, which serves as a solid state laser medium for injection locking and which is directly coupled with the laser diode 11. The laser diode pumped solid state laser is also provided with a condensing lens 13 for condensing and converging the laser beam 10, and a YVO$_4$ crystal 14, which serves as a primary solid state laser medium and which is located at the position of convergence of the laser beam 10 by the condensing lens 13. The laser diode pumped solid state laser is additionally provided with a resonator mirror 15 having one end face 15a, which is a concave surface having a radius of curvature of 50 mm and which stands facing the YVO$_4$ crystal 14, and a KTP crystal 16, which is located between the YVO$_4$ crystal 14 and the resonator mirror 15. These elements are mounted together with one another on a single case (not shown).

The YVO$_4$ crystal 12 for injection-locking is containing 1 at % of neodymium (Nd) and has a thickness of 0.1 mm. The YVO$_4$ crystal 14 is containing 2 at % of neodymium (Nd) and has a thickness of 1 mm.

The laser diode 11 produces the laser beam 10 having a wavelength of $1\lambda = 809$ nm. The laser beam 10 impinges upon the YVO$_4$ crystal 12 for injection locking. Part of the laser beam 10 passes through the YVO$_4$ crystal 12 for injection locking, is condensed by the condensing lens 13, and then impinges upon the YVO$_4$ crystal 14. The YVO$_4$ crystal 12 for injection locking is pumped by the laser beam 10 and produces a laser beam 17 for injection locking in the single longitudinal mode. The laser beam 17 has a wavelength of $\lambda 2 = 1,064$ nm. Also, the YVO$_4$ crystal 14 is pumped by the laser beam 10 and produces a laser beam 18 having a wavelength of $\lambda 2 = 1,064$ nm. The KTP crystal 16, which is a nonlinear optical material, converts the laser beam 18 into its green second harmonic 19 having a wavelength of $\lambda 3 = \lambda 2/2 = 532$ nm.

A coating 20 and a coating 21 are overlaid respectively on end faces 12a and 12b of the YVO$_4$ crystal 12 for injection locking. A coating 22 is overlaid on one end face of the YVO$_4$ crystal 14. A coating 23 and a coating 24 are overlaid respectively on end faces 16a and 16b of the KTP crystal 16. Also, a coating 25 is overlaid on the end face 15a of the resonator mirror 15. The characteristics of the coatings 20, 21, 22, 23, 24, and 25 with respect to the wavelengths of $\lambda 1 = 809$ nm, $\lambda 2 = 1,064$ nm, and $\lambda 3 = 532$ nm are shown below. AR represents no reflection (a transmittance of at least 99%), and HR represents high reflection (a reflectivity of at least 99.9%).

| | $\lambda 1 = 809$ nm | $\lambda 2 = 1,064$ nm | $\lambda 3 = 532$ nm |
| --- | --- | --- | --- |
| Coating 20 | AR | HR | — |
| Coating 21 | AR | 5% transmittance | — |
| Coating 22 | AR | HR | HR |
| Coating 23 | — | AR | AR |
| Coating 24 | — | AR | AR |
| Coating 25 | — | HR | AR |

Because the coatings 22 and 25 are provided, the laser beam 18, which serves as a fundamental wave, resonates between the end faces 14a and 15a. The laser beam 18 impinges in the resonating state upon the KTP crystal 16. Therefore, the laser beam 18 is sufficiently absorbed by the KTP crystal 16, and a high wavelength conversion efficiency can be obtained. In this embodiment, when the output power of the semiconductor laser is 500 mW, a second harmonic 19 having an output power of 50 mW is obtained.

In this embodiment, the length of the resonator for the laser beam 18, which resonator is constituted of the resonator mirror 15 and the YVO$_4$ crystal 14, is 10 mm. Also, the size of the cross-section of the KTP crystal 16, which cross-section is normal to the optical axis, is 3×3 mm, and the length of the KTP crystal 16 is 5 mm.

How the injection locking is effected will be described hereinbelow. Part of the laser beam 10, which has impinged upon the YVO$_4$ crystal 12 for injection locking, resonates between the end faces 12a and 12b provided respectively with the coatings 20 and 21 and is well absorbed by the YVO$_4$ crystal 12 for injection locking. The YVO$_4$ crystal 12 for injection locking is pumped by the laser beam 10 and generates the laser beam 17 for injection locking. The YVO$_4$ crystal 12 for injection locking is as thin as 0.1 mm. Therefore, the laser beam 17 for injection locking is produced in the single longitudinal mode. The laser beam 17 for injection locking, which has been produced in the single longitudinal mode, is injected into the resonator for the aforesaid laser beam 18. Accordingly, the laser beam 18 is obtained in the single longitudinal mode through the injection locking. When the laser beam 18 is thus brought to the single longitudinal mode, the second harmonic 19 is also brought to the single longitudinal mode. As a result, the second harmonic 19 is free of mode hopping and noise due to mode competition.

Figure 2:
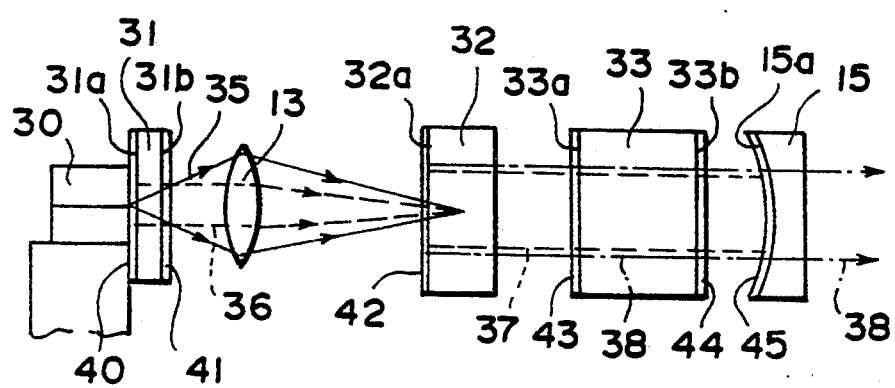
FIG. 2 is a side view showing a second embodiment of the laser diode pumped solid state laser in accordance with the present invention.

A second embodiment of the laser diode pumped solid state laser in accordance with the present invention will be described hereinbelow with reference to FIG. 2. In FIG. 2, similar elements are numbered with the same reference numerals with respect to FIG. 1.

In the second embodiment, YAG crystals 31 and 32 are employed in lieu of the YVO$_4$ crystals 12 and 14 used in the first embodiment. Also, as the nonlinear optical material, a KNbO$_3$ crystal 33 is employed in lieu of the KTP crystal 16. As the source for producing the pumping beam, a laser diode 30 is employed which produces a laser beam 35 having a wavelength of $1\lambda = 808$ nm.

In the second embodiment, the oscillation of the solid state laser, the conversion of the laser beam, which has been obtained from the solid state laser oscillation, into its second harmonic, and the injection locking is carried out in the same manner as that in the first embodiment. Specifically, the YAG crystal 31 for injection locking and the YAG crystal 32 are pumped by the laser beam 35 and produce laser beams 36 and 37 having a wavelength of $\lambda 2 = 946$ nm. The injection locking is effected by a laser beam 36 for injection locking, which is produced in the single longitudinal mode, and the laser beam 37 is brought to the single longitudinal mode. The laser beam 37, which serves as a fundamental wave, is converted by the KNbO$_3$ crystal 33 into its blue second harmonic 38 having a wavelength of $\lambda 3 = \lambda 2/2 = 473$ nm.

Coatings 40 and 41 are respectively overlaid on end faces 31a and 31b of the YAG crystal 31 for injection locking. A coating 42 is overlaid on an end face 32a of the YAG crystal 32. Coatings 43 and 44 are overlaid respectively on end faces 33a and 33b of the KNbO$_3$ crystal 33. Also, a coating 45 is overlaid on the end face 15a of the resonator mirror 15. The characteristics of the coatings 40, 41, 42, 43, 44, and 45 with respect to the wavelengths of $\lambda 1 = 808$ nm, $\lambda 2 = 946$ nm, and $\lambda 3 = 473$ nm are shown below.

|  | $\lambda 1 = 808$ nm | $\lambda 2 = 946$ nm | $\lambda 3 = 473$ nm |
|---|---|---|---|
| Coating 40 | AR | HR | — |
| Coating 41 | AR | 5% transmittance | — |
| Coating 42 | AR | HR | HR |
| Coating 43 | — | AR | AR |
| Coating 44 | — | AR | AR |
| Coating 45 | — | HR | AR |

The solid state laser medium and the nonlinear optical material employed in the laser diode pumped solid state laser in accordance with the present invention are not limited to those employed in the two embodiments described above. The laser diode pumped solid state laser in accordance with the present invention is also applicable when a laser beam, which has been obtained from the solid state laser oscillation, is converted into a wave other than the second harmonic.

What is claimed is:

1. A laser diode pumped solid state laser, comprising a primary solid state laser medium containing a rare earth metal which is pumped by a semiconductor laser, and wherein a wavelength of a laser beam having been obtained from the solid state laser oscillation is converted by a nonlinear optical material into a different wavelength, and means for producing injection locking in a single longitudinal mode, said means comprising a second solid state laser medium for injection locking, which is located between said primary solid state laser medium and said semiconductor laser, said second solid state laser medium for injection locking being pumped by said semiconductor laser and producing a laser beam for injection locking through solid state laser oscillation in the single longitudinal mode, such that said laser beam for injection locking impinges upon said primary solid state laser medium.

2. A laser diode pumped solid state laser as defined in claim 1, wherein said rare earth metal is neodymium.

3. A laser diode pumped solid state laser as defined in claim 1, further comprising means for converting said laser beam, which has been obtained from the second solid state laser oscillation and serves as a fundamental wave, into its second harmonic.

* * * * *